US007089104B2

(12) United States Patent
Post, II et al.

(10) Patent No.: US 7,089,104 B2
(45) **Date of Patent: *Aug. 8, 2006**

(54) SYSTEM AND METHOD FOR INHIBITING TORQUE STEER

(75) Inventors: James W. Post, II, Dublin, OH (US); Theodore Klaus, Marysville, OH (US)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/063,010

(22) Filed: Feb. 22, 2005

(65) Prior Publication Data

US 2005/0165532 A1 Jul. 28, 2005

Related U.S. Application Data

(63) Continuation of application No. 10/436,409, filed on May 12, 2003, now Pat. No. 6,909,958.

(51) Int. Cl.
*B60T 7/12* (2006.01)
*G05D 1/00* (2006.01)

(52) U.S. Cl. ............................ 701/84; 701/82; 701/85; 701/90; 180/197

(58) Field of Classification Search .................. 701/82, 701/84, 85, 90, 102, 115, 110; 180/197; 123/319, 337, 350, 352, 336, 361, 406.23
See application file for complete search history.

(56) References Cited

U.S. PATENT DOCUMENTS

| | | | |
|---|---|---|---|
| 5,362,284 A | 11/1994 | Brewer | |
| 5,511,630 A | 4/1996 | Kohata et al. | |
| 5,539,643 A | 7/1996 | Yamamoto et al. | |
| 5,623,906 A | 4/1997 | Storhok | |
| 5,819,705 A | 10/1998 | Scherer et al. | |
| 5,845,222 A | 12/1998 | Yamamoto et al. | |
| 5,976,056 A * | 11/1999 | Matsumoto et al. | 477/125 |
| 6,026,779 A * | 2/2000 | Obata et al. | 123/295 |
| 6,151,546 A | 11/2000 | Schmitt et al. | |
| 6,154,696 A | 11/2000 | Nishi et al. | |
| 6,246,951 B1 | 6/2001 | Robichaux et al. | |
| 6,449,553 B1 | 9/2002 | Saur et al. | |
| 6,543,414 B1 | 4/2003 | O'Neil et al. | |
| 6,600,988 B1 | 7/2003 | Da et al. | |
| 6,652,418 B1 | 11/2003 | Gutknecht-Stohr et al. | |
| 6,701,246 B1 | 3/2004 | Riedle et al. | |
| 6,704,641 B1 | 3/2004 | Tashiro et al. | |
| 6,909,958 B1 * | 6/2005 | Post et al. | 701/84 |

* cited by examiner

*Primary Examiner*—Gertrude A. Jeanglaude
(74) *Attorney, Agent, or Firm*—Rankin, Hill, Porter & Clark LLP; Mark E. Duell

(57) ABSTRACT

A method and system for inhibiting torque steer in a vehicle equipped with steerable wheels that are power driven. The method determines a maximum engine torque limit, determines an estimated driver-desired torque, and controls the actual torque, by adjustment of the throttle angle, to be the smaller of the maximum engine torque limit and the estimated driver-desired torque. Sensors measure steering angle and transmission gear position and a calculator determines the maximum engine torque limit based upon the steering angle and transmission gear position. Further sensors measure engine speed, throttle angle, and atmospheric pressure, and a calculator estimates driver-desired torque based upon the measured engine speed, throttle angle, and atmospheric pressure. A comparator selects the lower of the maximum engine torque limit and the driver-desired engine torque and uses the selected torque to control throttle angle to inhibit torque steer.

7 Claims, 3 Drawing Sheets

SYSTEM AND METHOD FOR INHIBITING TORQUE STEER

PRIORITY CLAIM

This application is a continuation of application Ser. No. 10/436,409, filed on May 12, 2003, which has issued as U.S. Pat. No. 6,909,958 on Jun. 21, 2005.

BACKGROUND OF THE INVENTION

1. Field of the Invention

The present invention is generally directed toward a method and system for inhibiting torque steer in a vehicle equipped with steerable wheels that are power driven.

2. Description of Related Art

Vehicles equipped with steerable wheels that are power driven such as front-wheel drive vehicles and four-wheel drive vehicles have the potential to generate a difference in left/right side tire longitudinal force under the application of engine torque. This difference in left/right side tire longitudinal force can be observed in most vehicles, but is especially noticeable in vehicles equipped with a traction enhancement device such as a limited slip differential or another type of torque splitting control device. The mismatch in left/right driving torque creates a difference in the suspension restoring torque between the left side and the right side of the vehicle that ultimately leads to perturbations in steering wheel torque, which is commonly referred to as "torque steer".

The dynamic conditions that operate to cause torque steer in a vehicle equipped with power-driven, steerable wheels, are well known in the art. Generally, when the vehicle's power-driven steerable wheels are turned to the left under the application of engine torque, the left side tire longitudinal force is smaller than the right side tire longitudinal force. This translates into a torque steer that the driver of the vehicle feels in the steering wheel as a pull to the left. Factors such as the amount of engine torque applied and the transmission gear selected contribute to the overall level of driving torque delivered to the front axle, the resulting left/right driving torque difference amount, and the resulting level of torque steer.

A variety of traction control systems are known that control the slip rate of the driving axle in order to enhance vehicle stability and maneuverability. These known traction control systems generally become active upon the occurrence of a wheel-slip condition or upon the occurrence of a difference in driving wheel speed. Upon sensing such a condition, such systems may incorporate engine throttle or torque control and/or brake system control to improve traction and to mitigate torque steer. The intent of such systems is to intervene in the event of excessive wheel slip so as to keep the tire slip rate within a desired range.

One such system is described in Schmitt et al., U.S. Pat. No. 6,154,546. This patent discloses a method and device for controlling traction in a motor vehicle in which a maximum transmittable driving torque is calculated as a function of various operating parameters of the vehicle and its turning performance. When a skidding tendency of at least one driving wheel occurs, the system engages and reduces engine torque to a calculated maximum transmittable torque value.

In many driving situations however, the left/right difference in longitudinal tire force can lead to a persistent torque steer before the onset of appreciable wheel slip. This situation is especially problematic when high levels of engine torque are applied as a vehicle is being steered in a direction other than straight on a high adhesion surface. In such situations, the torque steer condition occurs before a typical wheel-slip-based traction control system activates. Thus, conventional wheel-slip based traction control systems are generally ineffective to mitigate or inhibit torque steer before a wheel-slip condition occurs.

SUMMARY OF THE INVENTION

The present invention provides a method and system for inhibiting torque steer in a vehicle equipped with steerable wheels that are power driven. The method and system according to the invention inhibit torque steer by limiting the actual amount of engine torque applied to the wheels to the lower of an estimated driver-requested engine torque and a maximum engine torque limit. The method and system effectively inhibits torque steer before appreciable wheel-slip occurs, and thus operates to inhibit torque steer before activation of a conventional wheel-slip based traction control device.

The method according to the invention includes the steps of determining a maximum engine torque limit as a function of steering angle and transmission gear position, comparing the maximum engine torque limit with an estimated driver-requested engine torque, and adjusting or controlling engine operation so as to have actual engine torque be substantially equal to the lower of the maximum engine torque limit and the estimated driver-requested engine torque. The controlling step preferably includes providing a calculated engine throttle angle signal to an engine throttle controller, which adjusts engine throttle position. The torque steer inhibiting throttle command can be subordinate to one or more higher priority commands sent to the engine control system, such as a traction control throttle command sent to the throttle controller by a wheel-slip-based traction control system.

The system according to the invention comprises sensors that measure steering angle and transmission gear position, one or more controllers that calculate the maximum engine torque limit and estimated driver-requested engine torque, a comparator that selects a lower of the maximum engine torque and the estimated driver-requested engine torque, and a throttle angle calculator that determines the throttle angle based upon the selected engine torque and the engine speed. Because the system determines the maximum engine torque limit as a function of steering angle, the system allows for greater straight-line acceleration performance as compared to when the vehicle is being steered in a direction other than in a straight line. The invention improves the overall steering feel of vehicles equipped with steerable wheels that are power driven.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
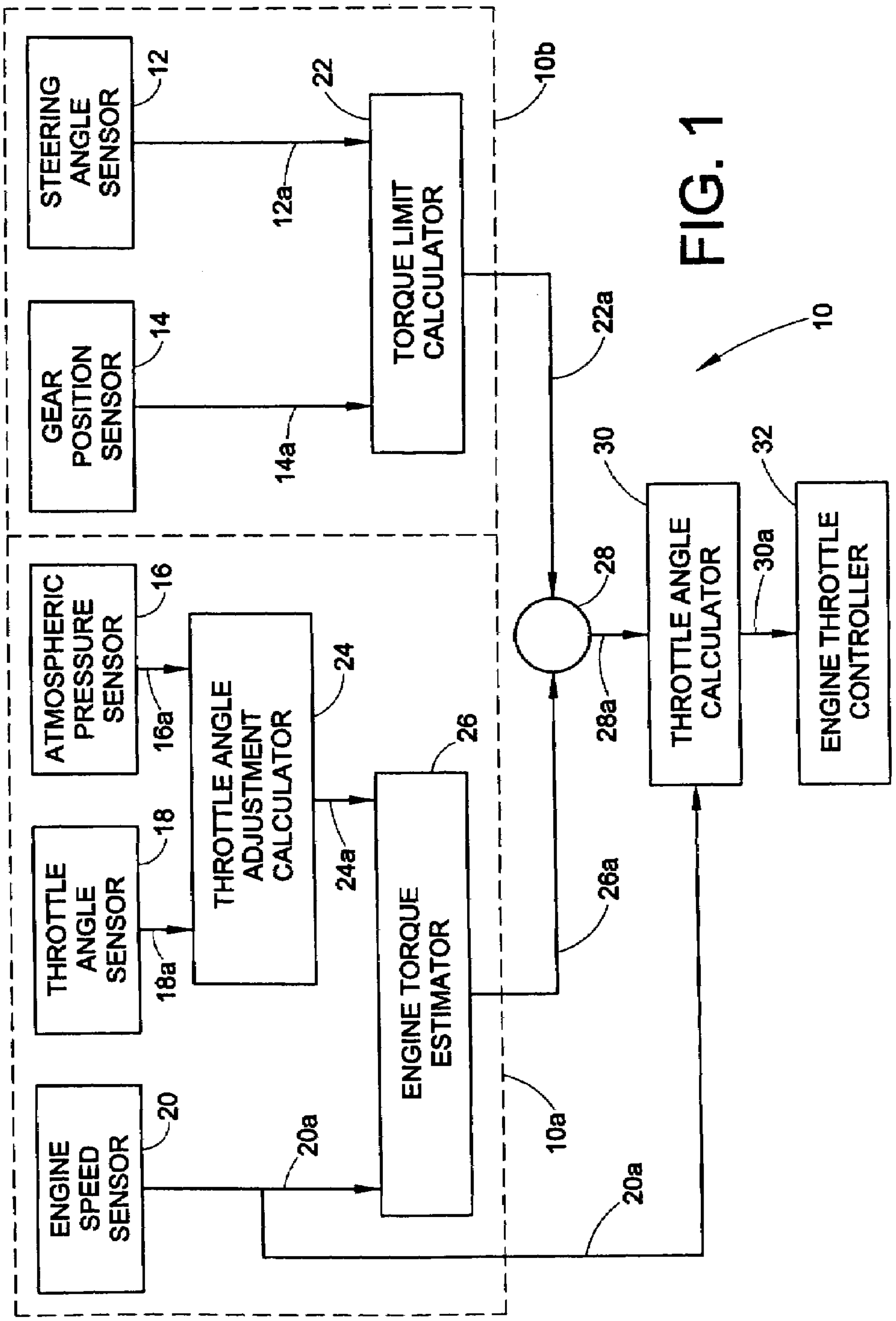
FIG. 1 schematically illustrates a torque steer inhibiting system according to the present invention.

With reference to FIG. 1, the system 10 according to the present invention includes a steering angle sensor 12, a gear position sensor 14, an atmospheric pressure sensor 16, a throttle angle sensor 18, an engine speed sensor 20, a torque limit calculator 22, a throttle adjustment angle adjustment calculator 24, an engine torque estimator 26, a comparator/selector 28, a throttle angle calculator 30, and an engine throttle controller 32. As will be appreciated from the following description, the engine speed sensor 20, throttle angle sensor 18, atmospheric pressure sensor 16, throttle angle adjustment calculator 24, and engine torque estimator 26 define an estimated engine torque portion 10*a* of the system 10, whereas the gear position sensor 14, steering angle position sensor 12, and torque limit calculator 22 define a maximum calculated torque portion 10*b* section of the system 10.

The steering angle sensor 12 measures steering angle. Steering angle can, but need not be, measured in terms of a positive or negative angle of steering wheel rotation from a neutral position, which is straight ahead driving (0° steering angle). In such an arrangement, a steering wheel turned a quarter revolution to the left from the neutral position would be a −90° steering angle. Likewise, a steering wheel turned a half revolution to the right from the neutral position would be a +180° steering wheel angle. The steering angle sensor 12 senses the position of the steering wheel relative to neutral and generates a steering angle signal 12*a* that is transmitted to the torque limit calculator.

The transmission gear position sensor 14 measures or detects transmission gear position. Transmission gear position is typically measured as an integer, where the first transmission gear is 1, the second transmission gear is 2, and so on. The transmission gear position sensor 14 senses the transmission gear position and generates a transmission gear position signal 14*a* that is transmitted to the torque limit calculator 22.

The torque limit calculator 22 receives the steering angle signal 12*a* from the steering angle sensor 12 and the transmission gear position signal 14*a* from the transmission gear position sensor 14 and uses this data, in combination with a software algorithm containing vehicle-specific parameters, to calculate a maximum engine torque limit. The torque limit calculator 22 transmits a maximum torque limit signal 22*a* to the comparator 28.

The maximum engine torque limit is the maximum amount of engine torque that can be applied in the particular transmission gear at the particular steering angle without producing an unacceptable amount of torque steer. This value must be calculated for each vehicle design, and will vary from vehicle to vehicle due to different suspension set-ups, weights, drag, steering ratios, etc. In all cases, however, the maximum engine torque limit will be much higher when the steering wheel is a neutral position for straight ahead driving (e.g., steering angle=0°) than when the steering wheel is turned away from the neutral position (e.g., steering angle is greater than or less than 0°).

Figure 2:
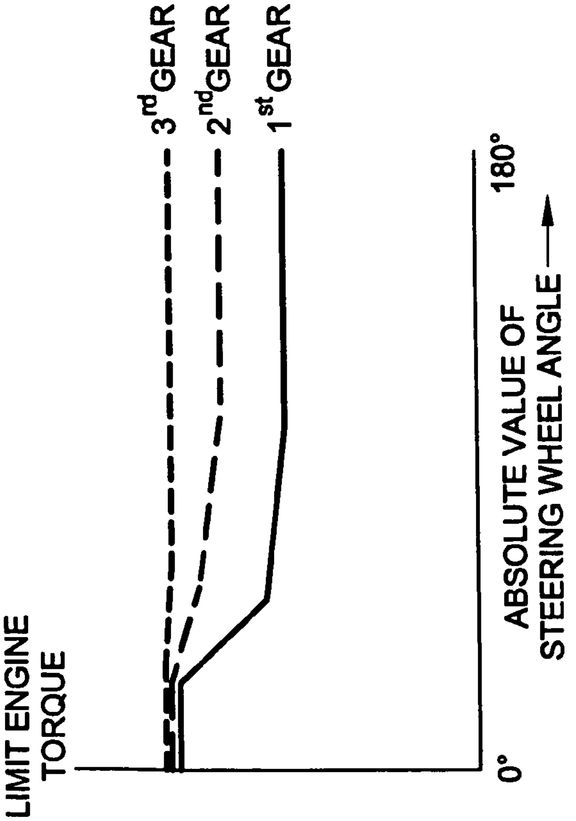
FIG. 2 is a graph showing an exemplary plot of the maximum transmittable torque limit as a function of steering angle for three transmission gear positions in a vehicle; and, FIGS. 3*a* through 3*f* are graphs comparing selected operating conditions as a function of time in a vehicle equipped with a system according to the invention (FIGS. 3*b*, 3*d*, and 3*f*) with the same operating conditions as a function of time in a vehicle that is not equipped with a system according to the invention (FIGS. 3*a*, 3*c*, 3*e*).

FIG. 2 shows an exemplary plot of the maximum engine torque limit for a vehicle as a function of steering angle from 0° to 180° (e.g., a right turn) in three transmission gear positions. It will be appreciated that the maximum engine torque limit for a right turn may be the same as for a left turn, or may be different. However, the maximum engine torque limit for a vehicle will always be higher when the steering wheel is at or near a neutral position as compared to when the steering wheel is turned significantly to the right or left of the neutral position.

Driver-requested engine torque is the amount of torque demanded or requested by the driver at any given moment in time. Driver-requested engine torque is typically related to accelerator pedal position, but will vary due to factors that affect engine performance. While it may, in some circumstances, be acceptable to employ a sensor that senses accelerator pedal position for estimating driver-requested engine torque, it is more accurate and preferable for the system to employ a plurality of sensors that measure various engine operating and environmental conditions, and to use the sensed conditions to estimate the driver-requested engine torque.

In the illustrated and preferred embodiment of the invention, the estimated torque calculating portion 10*a* of the system 10 includes the engine speed sensor 20 that measures engine speed and generates an engine speed signal 20*a*, the atmospheric pressure sensor 16 that measures atmospheric pressure and generates an atmospheric pressure signal 16*a*, and the throttle angle sensor 18 that measures driver-requested throttle position or angle and generates a driver-requested throttle angle signal 18*a*. The atmospheric pressure signal 16*a* and the throttle position signal 18*a* are fed to the throttle angle adjustment calculator 24, which calculates an atmospheric pressure-adjustment for the throttle angle, and outputs a throttle angle adjustment signal 24*a* to the engine torque estimator 26. The engine torque estimator 26 receives the throttle angle adjustment signal 24*a* and the engine speed signal 20*a*, and outputs an estimated driver-requested engine torque signal 26*a* to the comparator 28.

The comparator 28 receives the maximum torque limit signal 22*a* from the torque limit calculator 22 and the estimated driver-requested engine torque signal 26*a* from the engine torque estimator 26. The comparator 28 compares the maximum engine torque limit with driver-requested engine torque and passes a torque signal 28*a* corresponding to the lower of the estimated engine torque (driver-requested engine torque signal) and the calculated maximum torque (maximum torque limit signal) to the throttle angle calculator 30.

The throttle angle calculator 30 receives the torque signal 28*a* from the comparator 28 and the engine speed signal 20*a* from the engine speed sensor 20, and calculates the engine throttle angle that would produce the selected torque at the given engine speed. A calculated engine throttle angle signal 30*a* is transmitted from the throttle angle calculator 30 to the engine throttle control system 32. The engine throttle controller 32, in turn, adjusts the throttle angle to correspond with the calculated engine throttle setting and thereby controls the actual engine torque to substantially approximate the value of the torque signal 28*a* passed by the comparator 28.

The sensors 12, 14, 16, 18, 20 used in the system according to the invention can be utilized exclusively by the system or can be shared with other vehicle systems. Preferably, the sensors measure and transmit data continuously so that calculations and adjustments are made on a real time basis. Further, the calculators 22, 24, 30, estimator 26, comparator 28, and controller 32 are preferably provided in one or more microprocessors incorporating or utilizing appropriate control software, as will be appreciated by those skilled in the art, and may be dedicated to the system 10 or shared by other vehicle systems. Thus, the system is dynamic, and allows for immediate adjustments in throttle angle and, hence, actual engine torque in response to changes that are being made to steering angle, transmission gear position, and/or driver requested engine torque. The throttle angle adjustment signal 30*a* sent by the throttle angle calculator 30 can be granted a priority, which is either superior to or subordinate to one or more engine throttle commands sent to the engine throttle control system by other vehicle systems (i.e., the wheel-slip based traction control system).

The preferred method of inhibiting torque steer according to the present invention involves determining a maximum engine torque limit as a function of steering angle and transmission gear position, comparing the maximum engine torque limit with driver-requested engine torque, and controlling or adjusting actual engine torque (by adjustment of the throttle angle) to the lower of the maximum engine torque limit and the driver-requested engine torque. Unlike conventional methods, the method of the present invention effectively inhibits torque steer before a wheel-slip condition occurs.

It will be appreciated that the torque steer inhibiting system and method according to the present invention can be used on vehicle that is equipped with a conventional wheel-slip based traction control system. In such situations, the torque steer inhibiting system will be operational before the wheel-slip based traction control system.

It is preferable that the throttle angle adjustment signal 30*a* sent by the throttle angle calculator 30 be subordinate to, or to be given a lower priority than, any throttle commands that may be sent to the engine throttle control system 30 by the wheel-slip-based traction control system. Thus, the throttle control system of the present invention will be operable before any traction control system but, when a wheel-slip condition occurs, throttle commands transmitted to the engine throttle control system 32 or the like by the wheel-slip based traction control system take precedence over throttle commands 30*a* transmitted to the engine throttle control system 32 by the throttle angle calculator 30.

Figure 3A:
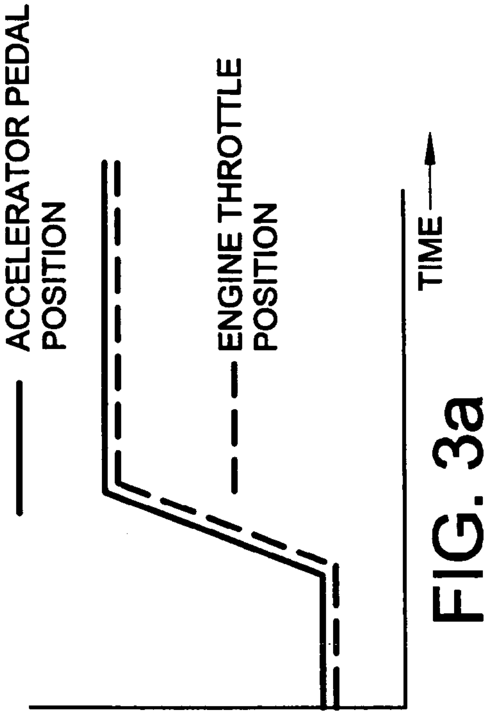
Figure 3B:
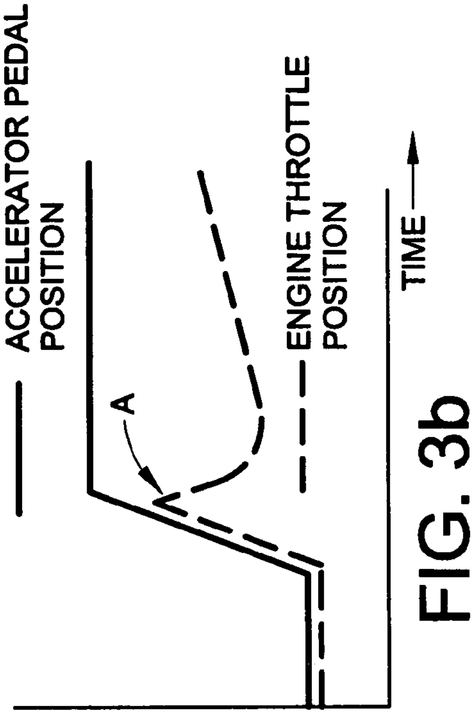
Figure 3C:
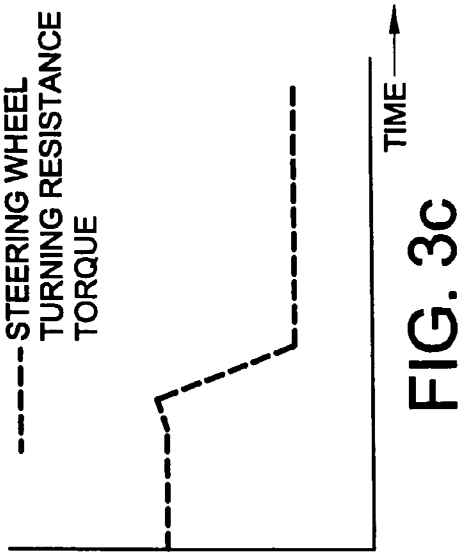
Figure 3D:
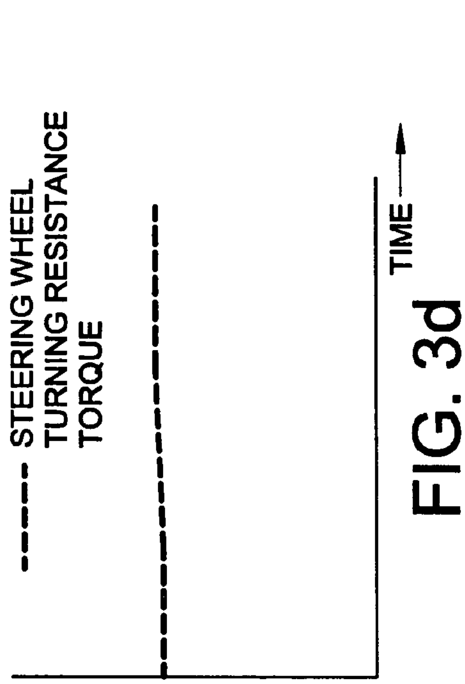
Figure 3E:
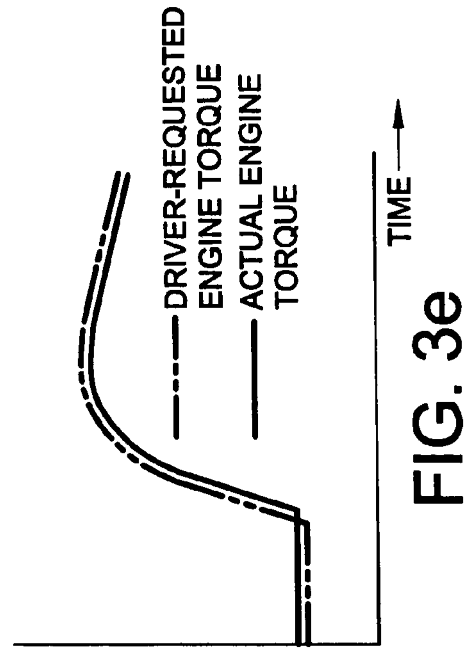

FIGS. 3*a* through 3*f* are graphs comparing selected operating conditions as a function of time in a vehicle equipped with a system according to the invention (FIGS. 3*b*, 3*d*, and 3*f*) with the same operating conditions as a function of time in a vehicle that is not equipped with a system according to the invention (FIGS. 3*a*, 3*c*, and 3*e*). FIGS. 3*a* and 3*b* show accelerator pedal position and engine throttle position as a function of time. In FIG. 3*a*, engine throttle position tracks accelerator pedal position. In FIG. 3*b*, engine throttle position initially tracks the accelerator pedal position until a point "A" at which throttle position or angle is retarded relative to accelerator pedal position due to operation of the system of the present invention. More specifically, and as will be appreciated from the foregoing description, at the point "A" the user requested engine torque exceeds the maximum engine torque limit and, therefore, the throttle angle is controlled so that the actual engine torque does not exceed the maximum permissible engine torque as embodied in the torque signal 28*a*. Accordingly, the throttle signal 30*a* to the engine throttle controller 32 serves to adjust the throttle position and, thus, actual engine torque to the maximum transmittable torque limit for the particular steering angle and transmission gear position and thereby inhibits torque steer.

FIGS. 3*c* and 3*d* show the torque steer experienced by the driver of the vehicle under the same conditions and time as in FIGS. 3*a* and 3*b*. It is noted that a significant amount of torque steer is created or experienced in the vehicle of FIG. 3*c* (in which the inventive system is not employed), whereas torque steer is substantially prevented or inhibited in the vehicle depicted in FIG. 3*d*, wherein the system of the present invention is utilized.

Figure 3F:
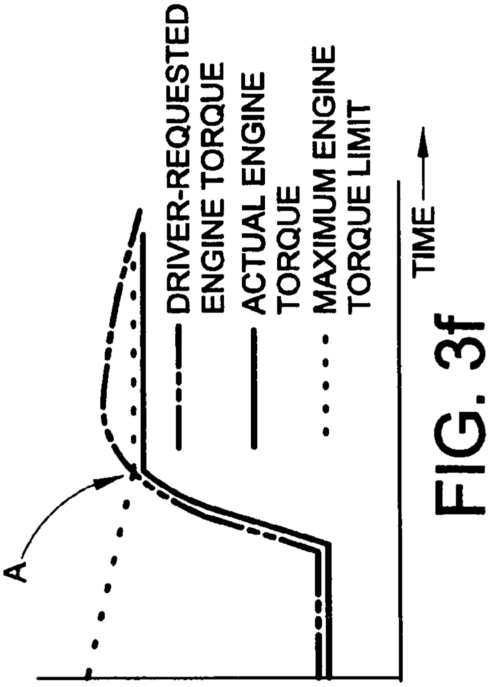

FIGS. 3*e* and 3*f* compare driver-requested engine torque, actual engine torque, and limit torque value under conditions similar to those of FIGS. 3*a*–3*d*. In FIG. 3*e*, it is noted that the driver-requested, actual, and limit torques are equal to one another. However, FIG. 3*f* shows that, in a vehicle equipped with the system of the present invention, actual engine torque is limited to the lower of driver-requested engine torque and the maximum engine torque limit (maximum permissible torque). Thus, the actual engine torque tracks the driver-requested engine torque until point "A" at which the maximum engine torque limit is lower than the driver-requested engine torque, at which point the actual engine torque tracks the maximum engine torque limit.

The system according to the invention limits actual engine torque to a value that prevents or minimizes torque steer, and does so well before a wheel-slip based traction control system could activate and intervene. Thus, the system of the present invention is proactive rather than reactive. Furthermore, since the system and method of the invention operate before a wheel-slip based traction control systems can intervene, the system can effectively inhibit torque steer at low levels of transverse acceleration when wheel-slip conditions do not occur. This means that the vehicle need not be at its limit of turning performance for the system to operate to inhibit torque steer.

The system according to the present invention may operate much more frequently to inhibit torque steer than wheel-slip-based traction control systems, especially under high driver-requested engine torque conditions on high adhesion surfaces. On low adhesion surfaces, sufficient wheel slip may occur before the torque steer limit torque is reached, and the wheel-slip based traction control system therefore may become active such that torque steer function limit control is not used.

While the preferred embodiment of the present invention has been disclosed herein, the present invention is not limited thereto. Rather, the method of the present invention is capable of numerous modification and improvements and, therefore, the scope of the present invention is only defied by the claims appended hereto.

What is claimed is:

1. A method for inhibiting torque steer in a vehicle equipped with steerable wheels that are power driven, the method comprising the steps of:

determining a maximum engine torque limit, above which an unacceptable amount of torque steer is produced wherein the maximum engine torque limit is calculated, in combination with a software algorithm containing vehicle specific parameters, as a function of a steering angle and a transmission gear position;

estimating a driver-requested engine torque;

comparing the maximum engine torque limit with driver-requested engine torque; and adjusting a throttle angle so that actual engine torque is approximately equal to a lower one of the maximum engine torque limit and the driver-requested engine torque.

2. The method according to claim 1, wherein driver-requested engine torque is calculated as a function of engine speed and a driver-requested throttle position.

3. The method according to claim 2, wherein the driver-requested engine torque is further calculated as a function of atmospheric pressure.

4. A torque steer inhibiting method for a vehicle having steerable wheels that are power driven and a wheel-slip-activated traction control system, wherein said method comprising the steps of:

determining a maximum engine torque limit, above which an unacceptable amount of torque steer is produced wherein the maximum engine torque limit is calculated, in combination with a software algorithm containing vehicle specific parameters, as a function of a steering angle and a transmission gear position;

estimating a driver-requested engine torque;

comparing the maximum engine torque limit with driver-requested engine torque; and when said driver-requested engine torque is less than said maximum engine torque limit, using said driver-requested engine torque as a torque control signal; and, when said driver-requested engine torque is more than said maximum engine torque limit, using said maximum engine torque limit as the torque control signal; and, adjusting the throttle angle so that actual engine torque is approximately equal to the torque control signal.

5. The method according to claim 4, wherein driver-requested engine torque is calculated as a function of engine speed and a driver-requested throttle position.

6. The method according to claim 5, wherein the driver-requested engine torque is further calculated as a function of atmospheric pressure.

7. A system for inhibiting torque steer in a vehicle equipped with steerable wheels that are power driven, the system comprising:

a torque limit calculator that calculates a maximum engine torque limit, above which an unacceptable amount of torque steer is produced based upon sensed operating conditions;

an estimated driver-requested engine torque calculator that calculates a driver-requested engine torque based upon driver input and sensed operating conditions;

a comparator that compares the maximum engine torque limit and the driver-requested engine torque and outputs a torque signal that is equal to a lower of said maximum engine torque limit and the driver-requested engine torque;

a throttle angle calculator that outputs a throttle angle control signal that is used to control throttle angle such that actual torque is approximately equal to the torque signal; and a steering angle sensor and a transmission gear position sensor, said steering angle sensor serving to measure a steering angle and generate a steering angle signal, said transmission gear position sensor serving to measure a transmission gear position and generate a transmission gear position signal, and wherein said steering angle signal and said transmission gear position signal are used by said torque limit calculator to calculate said maximum engine torque limit.

* * * * *